(12) United States Patent
Thomas et al.

(10) Patent No.: US 10,940,587 B2
(45) Date of Patent: Mar. 9, 2021

(54) DATA ASSOCIATION AWARE BELIEF SPACE PLANNING AND PERCEPTION

(71) Applicant: Technion Research & Development Foundation Ltd., Haifa (IL)

(72) Inventors: Antony Thomas, Kochi (IN); Shashank Pathak, Allahabad (IN); Vadim Indelman, Haifa (IL)

(73) Assignee: Technion Research & Development Foundation Ltd., Haifa (IL)

( * ) Notice: Subject to any disclaimer, the term of this patent is extended or adjusted under 35 U.S.C. 154(b) by 345 days.

(21) Appl. No.: 15/966,619

(22) Filed: Apr. 30, 2018

(65) Prior Publication Data
US 2018/0311819 A1  Nov. 1, 2018

Related U.S. Application Data

(60) Provisional application No. 62/491,292, filed on Apr. 28, 2017.

(51) Int. Cl.
| | | |
|---|---|---|
| *B25J 9/16* | (2006.01) | |
| *G06N 7/00* | (2006.01) | |
| *G06F 17/18* | (2006.01) | |

(52) U.S. Cl.
CPC .......... *B25J 9/1633* (2013.01); *B25J 9/1602* (2013.01); *B25J 9/1671* (2013.01); *B25J 9/1694* (2013.01); *G06F 17/18* (2013.01); *G06N 7/005* (2013.01)

(58) Field of Classification Search
CPC ...... B25J 9/1602; B25J 9/1633; B25J 9/1671; B25J 9/1694; G06F 17/18; G06N 7/005
See application file for complete search history.

(56) References Cited

U.S. PATENT DOCUMENTS

| | | | | |
|---|---|---|---|---|
| 7,055,601 B2* | 6/2006 | Barrow | ................... | E21B 47/04 166/255.1 |
| 8,503,760 B2* | 8/2013 | Lee | .......................... | G06T 7/35 382/154 |
| 8,930,023 B2* | 1/2015 | Gutmann | ............... | B25J 9/1694 700/258 |
| 9,062,978 B2* | 6/2015 | Win | ..................... | G01C 21/206 |
| 9,946,264 B2* | 4/2018 | Liao | ..................... | G05D 1/0253 |
| 10,093,021 B2* | 10/2018 | Aghamohammadi | ...................... | G05D 1/0274 |

(Continued)

FOREIGN PATENT DOCUMENTS

WO  WO-2013150286 A1 * 10/2013 ............. G01S 17/87

*Primary Examiner* — Nicholas Kiswanto
(74) *Attorney, Agent, or Firm* — Novick, Kim & Lee, PLLC; Jae Youn Kim (57) ABSTRACT

Methods and systems are provided for controlling a robot to navigate a perceptually aliased environment, the robot being configured to infer a first Gaussian mixture model (GMM) of a first pose of the robot, and to plan an optimal control action by: determining a second GMM of a simulated pose of the robot by simulating applying the first control action to the first GMM; determining from the second GMM a range of possible observations; calculating scene probabilities for associating each possible observation with each aliased scene of a set of aliased scenes; calculating from the scene probabilities an objective function to determine an estimated cost of the first control action; and comparing the estimated cost of the first control action with estimated costs calculated for one or more additional control actions, to determine an optimal control action.

10 Claims, 5 Drawing Sheets

(56) References Cited

U.S. PATENT DOCUMENTS

| | | | |
|---|---|---|---|
| 10,504,008 B1* | 12/2019 | Powers | G06K 9/6282 |
| 2014/0201126 A1* | 7/2014 | Zadeh | A61B 5/165 |
| | | | 706/52 |
| 2017/0004406 A1* | 1/2017 | Aghamohammadi | |
| | | | G06N 5/045 |
| 2019/0258918 A1* | 8/2019 | Wang | G06N 3/084 |

* cited by examiner

Algorithm 1 Myopic data association aware bsp

Input: Current belief $b[X_k]$, history $\mathcal{H}_k$, action $u_k$, scenes $\{A_\mathbb{N}\}$, event likelihood $\mathbb{P}(A_i \mid \mathcal{H}_k, x)$ for each $A_i \in \{A_\mathbb{N}\}$ 1: $b[X_{k+1}^-] \leftarrow b[X_k]\mathbb{P}(x_{k+1} \mid x_k, u_k)$ ▷ Eq. 8
2: $\{z_{k+1}\} \leftarrow \text{SimulateObservations}(b[X_{k+1}^-], \{A_\mathbb{N}\})$
3: $J \leftarrow 0$
4: for $\forall z_{k+1} \in \{z_{k+1}\}$ do
5: $\quad w_s \leftarrow 0$
6: $\quad$ for $i \in [1 \ldots |A|]$ do
7: $\quad\quad$ ▷ compute weight, Eq. 16
8: $\quad\quad w_i \leftarrow \text{CalcWeights}(z_{k+1}, \mathbb{P}(A_i \mid \mathcal{H}_{k+1}^-, x), b[X_{k+1}^-])$
9: $\quad\quad w_s \leftarrow w_s + w_i$
10: $\quad\quad$ ▷ Calculate posterior belief given $A_i$, Sec. 4.5
11: $\quad\quad b[X_{k+1}^{i+}] \leftarrow \text{UpdateBelief}(b[X_{k+1}^-], z_{k+1}, A_i)$
12: $\quad$ end for
13: $\quad \{\tilde{w}_i\} \leftarrow \text{NormalizeWeights}(\{w_i\})$
14: $\quad c \leftarrow \text{CalcCost}(\{\tilde{w}_i\}, \{b[X_{k+1}^{i+}]\})$
15: $\quad J \leftarrow J + w_s \cdot c$
16: end for
17: return $J$

FIG. 3

Algorithm 2 Non-myopic Data association aware bsp

Input: Current belief $b[X_k]$, history $\mathcal{H}_k$, action $u_k$, scenes $\{A_N\}$, event likelihood $\mathbb{P}(A_i \mid \mathcal{H}_k, x)$ for each $A_i \in \{A_N\}$ 1: $b[X_{k+1}^-] \leftarrow b[X_k]\mathbb{P}(x_{k+1} \mid x_k, u_k)$ ▷ Eq. 8
2: $\{z_{k+1}\} \leftarrow \text{SimulateObservations}(b[X_{k+1}^-], \{A_N\})$
3: $J \leftarrow 0$
4: for $\forall z_{k+1} \in \{z_{k+1}\}$ do
5:    $w_* \leftarrow 0$
6:    for $i \in [1 \ldots |A|]$ do
7:       ▷ compute weight, Eq. 16
8:       $w_{k+1}^i \leftarrow \text{CalcWeights}(z_{k+1}, \mathbb{P}(A_i \mid \mathcal{H}_{k+1}^-, x), b[X_{k+1}^-])$
9:       $w_* \leftarrow w_* + w_i$
10:       for $\forall j \in [1, \ldots, M_k]$ do
11:          ▷ compute weight $\bar{w}_{k+1}^{ij}$ for each GMM component, Eq. 37
12:          $\bar{w}_{k+1}^{ij} \leftarrow \text{CalcWeights}(z_{k+1}, \mathbb{P}(A_i \mid \mathcal{H}_{k+1}^-, x), b[X_{k+1}^{j-}])$
13:          $\xi_{k+1}^{ij} \leftarrow \xi_k^j \bar{w}_{k+1}^{ij}$ ▷ Eq. 39
14:          ▷ Calculate posterior of $b[X_{k+1}^{j-}]$, given $A_i$, Sec. 5.2
15:          $b[X_{k+1}^{ij+}] \leftarrow \text{UpdateBelief}(b[X_{k+1}^{j-}], z_{k+1}, A_i)$
16:       end for
17:    end for
18:    Prune components with weights $\xi_{k+1}^{ij}$ below a threshold
19:    Construct $b[X_{k+1}^+]$ from the remaining $M_{k+1}$ components, Eq. 38
20:    $c \leftarrow \text{CalcCost}(b[X_{k+1}^+])$ ▷ Sec. 4.7
21:    $J \leftarrow J + w_* \cdot c$
22: end for
23: return $J$

| Algorithm | Epoch | Planning | | | Inference | | |
|---|---|---|---|---|---|---|---|
| | | $t(s)$ | $\eta_{da}$ | $\tilde{m}$ | $t(s)$ | $\eta_{da}$ | $\tilde{m}$ |
| | 1 | 21.81 | 0.09 | 6.00 | 0.84 | 0.22 | 4.00 |
| | 4 | 5.19 | 0.28 | 2.50 | 0.84 | 0.31 | 3.00 |
| DA-BSP | 8 | 8.66 | - | 1.00 | 0.80 | 1.00 | 1.00 |
| | 12 | 19.90 | - | 6.67 | 2.48 | 0.35 | 5.00 |
| | 16 | 3.50 | 0.16 | 2.00 | 0.14 | - | 10.00 |
| | 20 | 4.51 | 0.73 | 3.80 | 0.31 | 1.00 | 1.00 |

FIG. 5

DATA ASSOCIATION AWARE BELIEF SPACE PLANNING AND PERCEPTION

FIELD OF THE INVENTION

The present invention relates to autonomous navigation and in particular to robotic guidance and control with active perception.

BACKGROUND OF THE INVENTION

Belief space planning (BSP) and decision making under uncertainty are fundamental problems in robotics and artificial intelligence, with applications including autonomous navigation, object grasping and manipulation, active simultaneous localization and mapping (SLAM), and robotic surgery. In presence of uncertainty, such as uncertainty in robot motion and sensing, the true states of variables of interest (e.g. robot poses) are unknown and can only be represented by a probability distribution of possible states given available data.

SUMMARY OF THE INVENTION

In order to overcome shortcomings of belief space planning (BSP) under uncertainty, embodiments of the present invention provide systems and methods for data association aware belief space planning (DA-BSP). An embodiment of the present invention provides a robot-implemented method, the robot having at least one sensor and a programmed task. Performing the programmed task requires implementing one or more of a set of control actions, wherein the set of control actions includes a first control action, and wherein each control action changes a pose of the robot. The robot-implemented method includes inferring, from a scene observed by the sensor, while the robot is at a first pose, a probability distribution function (pdf) of the first pose, wherein the scene is one alias of a plurality of aliased scenes, such that the first pose pdf is a first mixture pdf, including a component pdf for each of the plurality of aliased scene. The method further includes planning an optimal control action by: determining a second mixture pdf of a simulated pose of the robot, by simulating an application of the first control action to the first mixture pdf; determining from the second mixture pdf a range of possible observations; calculating scene probabilities for associating each possible observation with each aliased scene of a set of aliased scenes; calculating from the scene probabilities an objective function to determine an estimated cost of the first control action; comparing the estimated cost of the first control action with estimated costs calculated for one or more additional control actions, to determine an optimal control action; and executing the optimal control action to put the robot at a new pose.

An embodiment may further include making a new observation from the new pose and determining, from the new observation, a new pdf of the new pose of the robot. In some embodiments, determining the new pdf may include determining that an observed new scene is a singular scene having no aliases, resulting in disambiguation such that the new pdf includes only one pdf component corresponding to the singular scene.

Calculating the objective function from the scene probabilities may include calculating from the scene probabilities, for each possible observation of the range of possible observations, a likelihood weight, and applying the likelihood weight to the objective function. Calculating the objective function may also include integrating a product of two factors over all observations in the range of possible observations, wherein a first factor represents a likelihood of a given observation, given a history of actions and the first control action, and wherein the second factor corresponds to a probability of the second mixture pdf, given the history and the given observation.

In some embodiments the possible observations are generated by sampling viewpoints from the second mixed pdf and associating the sampled viewpoints with respective observed scenes according to a mapping of the environment. The simulated observations, made from the possible poses, may be determined by an event likelihood relationship. In further embodiments, the cost function may be based on a Kullback-Leibler divergence with respect to the likelihood weights.

The planning may be a multi-stage planning process, wherein the second mixture pdf is generated by simulating a sequence of control actions, and wherein the optimal control action is determined as the control action initiating an optimal sequence of control actions.

The scene probabilities may be pruned by comparing each scene probability with a predefined weight threshold, to remove scene probabilities having negligible probabilities.

There is further provided, by embodiments of the present invention, a robotic system for navigating a perceptually aliased environment, including a robot having at least one sensor and a programmed task, wherein performing the programmed task may include implementing one or more of a set of control actions, wherein the set of control actions may include a first control action, and wherein each control action changes a pose of the robot, wherein the robot may include a processor and a memory with instructions that when executed by the processor cause the robot to perform steps of inferring, planning, and execution. Inferring may include inferring from a scene observed by the sensor, while the robot is at a first pose, a probability distribution function (pdf) of the first pose, wherein the scene is one alias of a plurality of aliased scenes, such that the first pose pdf is a first mixture pdf, including a component pdf for each of the plurality of aliased scenes. Planning may including planning an optimal control action by: determining a second mixture pdf of a simulated pose of the robot by simulating an application of the first control action to the first mixture pdf; determining from the second mixture pdf of the simulated pose a range of possible observations; calculating scene probabilities for associating each possible observation with each aliased scene of a set of aliased scenes; calculating from the scene probabilities an objective function to determine an estimated cost of the first control action; and comparing the estimated cost of the first control action with estimated costs calculated for one or more additional control actions to determine an optimal control action. Executing may include executing the optimal control action to put the robot at a new pose.

The invention accordingly comprises the several steps and the relation of one or more of such steps with respect to each of the others, and the apparatus embodying features of construction, combinations of elements and arrangement of parts that are adapted to affect such steps, all is exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

1. Overview

Embodiments of the present invention provide a belief space planning (BSP) approach for robot control that incorporates reasoning about data association (DA) within planning, while considering additional sources of uncertainty. The data association aware belief space planning (DA-BSP) approach accommodates an environment that may be ambiguous and perceptually aliased. A perceptually aliased environment is one in which there are multiple nearly identical landmarks or objects, such that two observations of the environment, made from different positions and orientations (that is, from different 'poses'), may seem to be identical. Two observed scenes that seem to be identical are aliases for each other. Due to perceptual aliasing, a posterior belief about a robot pose may be represented as a mixture of probability distribution functions (pdfs).

Design cost functions may be applied to measure an expected level of ambiguity and a posterior uncertainty of a given candidate action. The DA-BSP approach was introduced by the authors of the present invention in the article, 'Nonmyopic data association aware belief space planning for robust active perception', IEEE Intl. Conf. on Robotics and Automation (ICRA), 2017, which is incorporated herein by reference.

Hereinbelow, the term 'belief' means an estimate regarding a robot pose, which is uncertain and is therefore represented as a pdf. A pose is generally a position and/or orientation and/or a set of additional variables of interest with respect to the robot. The belief is typically a posterior pdf, that is, a pdf given a variety of evidence, such as prior observations and control actions.

A belief may be a joint belief over robot past and current poses (e.g., the trajectory of the robot path), and potentially also over landmarks being observed (assuming these are uncertain). The framework described here models a belief as multi-modal, that is as a mixture pdf of multiple pdf components, typically a Gaussian mixture model (GMM). The number of components of this GMM can increase as well as decrease. Using these and standard costs (such as a control penalty or distance to goal) within an objective function, the framework may represent the impact of an action, and in particular, is capable of active disambiguation, as described further hereinbelow. Data-association-aware planning may also be performed over several look ahead actions. The framework is applicable to both robust perception in a passive setting with the control data given a priori and in an active setting such as in autonomous navigation in perceptually aliased environments.

2. Notations and Problem Formulation

Figure 1A:
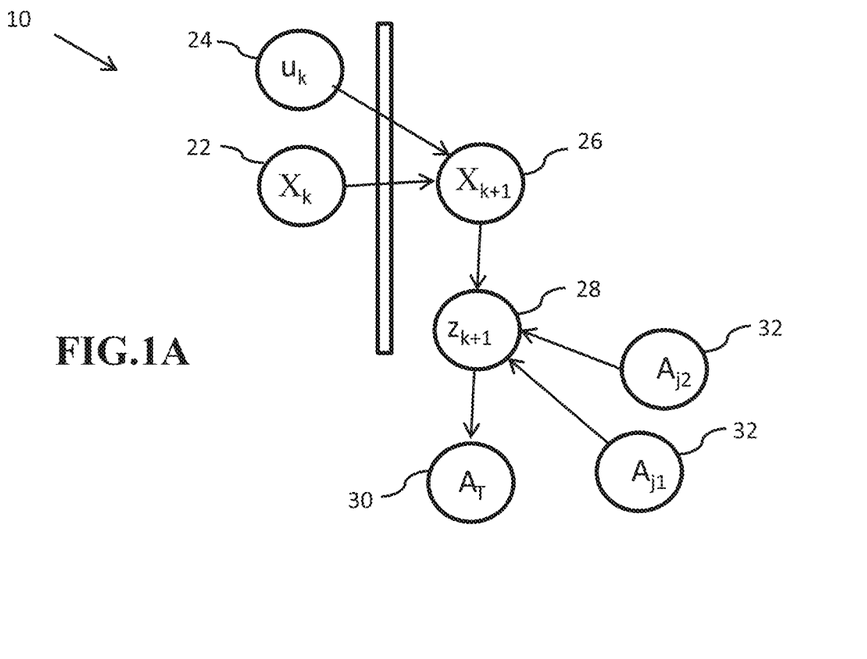
FIG. 1A is a pictorial illustration of a step in a process for determining a robot action, in an environment with perceptual aliasing, according to an embodiment of the present invention.

FIG. 1A is an illustration of a process 10, whereby a robot is situated at a first estimated pose 22, at some point in time k, i.e., after completing k control actions of a task, which is typically pre-defined or programmed, such as reaching a destination or locating an object. The estimated first pose is indicated as $X_k$. The robot operates in a partially known or pre-mapped environment. The robot is equipped with one or more sensors, which take observations of different scenes or objects in the environment and uses these observations to infer, based on a mapping of the environment (i.e., a predefined mapping), random variables of interest (which are application-dependent). Thus, in localization, these observations can be used to better estimate the robot pose. In a search application, for example, the goal may be to find the object of the search with a minimal cost, where a cost function may include parameters such as time and distance. The pose $X_k$, is affected by a control action $u_k$ 24, by which the robot pose is physically altered, resulting in a new pose 26, indicated as $X_{k+1}$. The new pose is also uncertain. Sensors of the robot make an observation 28, indicated as $z_{k+1}$. The observation may be correlated with different scenes that have been mapped in the environment. These would include an actual scene 30, indicated as $A_T$, as well as aliased scenes 32, indicated as $A_{j1}$ and $A_{j2}$.

Figure 1B:
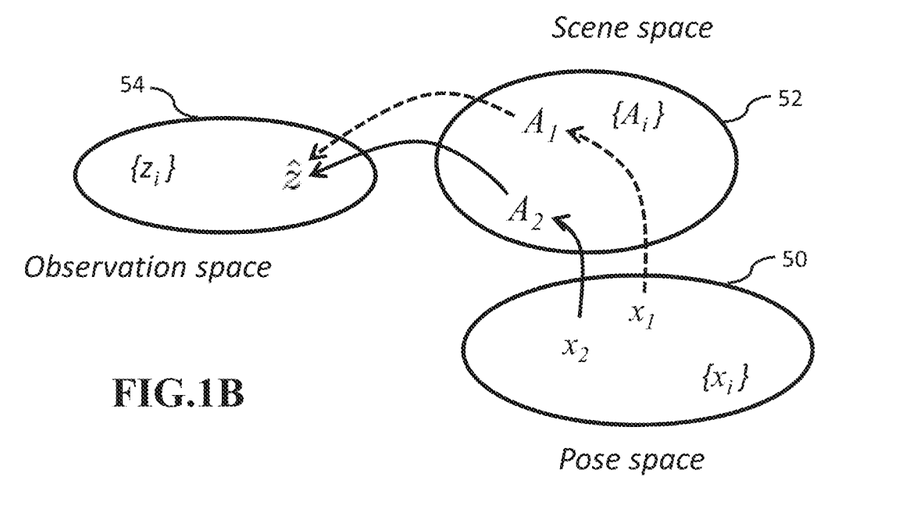
FIG. 1B shows relationships between three spaces: a pose-space, a scene-space and an observation-space, according to an embodiment of the present invention.

A schematic equivalent can be seen in FIG. 1B, which involves three spaces: a pose-space 54, a scene-space 52 and an observation-space 54. Scenes $A_1$ and $A_2$ when viewed from perspective x1 and x2 respectively, produce the same nominal observation 2, giving rise to perceptual aliasing.

The pose-space involves all possible perspectives a robot can take with respect to a given world model and in a context of a task at hand. We shall denote a particular pose at any incremental time k as $x_k$, and the sequence of these poses from 0 up to k as $X_k \doteq \{x_0, \ldots, x_k\}$. More broadly, $X_k$ may be defined as a robot state including all variables of interest, including not only past and present poses (i.e., the trajectory), but records of past observations. Uncertainty in a robot's pose means that a current pose of the robot, at any incremental time k, can only be estimated as a posterior probability distribution function $P(X_k|u_{0:k-1}, Z_{0:k})$, that is, a pdf of the pose, when all control actions $u_{0:k-1} \doteq \{u_0, \ldots, u_{k-1}\}$ and observations $Z_{0:k} \doteq \{Z_0, \ldots, Z_k\}$ up to time k are given. For notational convenience, current and propagated 'histories' $H_k$ and $H_{k+1}^-$, respectively, are defined as $$H_k \doteq \{u_{0:k-1}, Z_{0:k}\}, H_{k+1}^- \doteq H_k \cup \{u_k\}. \tag{1}$$

and the posterior pdf at time k is designated hereinbelow as the belief):

$$b[X_k] \doteq P(X_k|H_k). \tag{1a}$$

The belief may also be called a 'joint belief', given that $X_k$ is a multi-variable state.

The scene-space is a discrete set of objects, (or a collection of objects), called scenes, and denoted by the set $\{A_N\}$. Scenes can be detected through the sensors of the robot. We shall use symbols $A_i$ and $A_j$ to denote such typical scenes. Note that even if the objects are identical, they are distinct in the scene space.

Finally, observation-space is the set of all possible observations of scenes that the robot is capable of obtaining when considering its mission and sensory capabilities. We may define an observation by an 'observation' or 'measurement' model:

$$z_k = h(x_k, A_i) + v_k, v_k \sim N(0, \Sigma_v), \quad (2)$$

and represent it probabilistically as $P(z_k|x_k, A_i)$. The model assumes the same Gaussian noise for all observations, as noise is a typical property of robotic sensors employed. $h(x_k, A_i)$ is a noise-free observation which referred to as a nominal observation $\hat{z}$.

For example, for a camera sensor, the function h could be defined as a pinhole projection operator, thereby projecting the object $A_i$ onto the image plane. For a range sensor this function could calculate the range between (a particular point on) the object and the robot's actual location. The above functions apply regardless of whether an environment model is given but uncertain, or whether the environment model is unknown a priori and is constructed within a SLAM framework.

A standard motion model with Gaussian noise may be represented as $$x_{i+1} = f(x_i, u_i) + w_i, w_i \sim N(0, \Sigma_w) \quad (3)$$

where $u_i$ is a control action causing motion of the robot and $\Sigma_w$ is the process noise covariance. The model may be denoted probabilistically by $P(x_{i+1}|x_i, u_i)$.

Given an initial prior pdf $P(x_0)$ and motion and observation models, a joint posterior pdf at a current time k can be written as $$P(X_k | \mathcal{H}) = P(x_0) \prod_{i=1}^{k} P(x_i | x_{i-1}, u_{i-1}) P(Z_i | x_i, A_i). \quad (4)$$

This joint posterior pdf is thus a multivariate Gaussian, $P(X_k|H_k) = N(\hat{X}_k, \Sigma_k)$ with mean $\hat{X}_k$ and covariance $\Sigma_k$, which can be efficiently calculated via maximum a posteriori (MAP) inference. See, for example, M. Kaess, et al., iSAM2: Incremental smoothing and mapping using the Bayes tree. Intl. J. of Robotics Research, 31:217-236, February 2012, which is incorporated herein by reference.

Given the joint posterior pdf at the current time k (Eq. 4), one can reason about the best future actions that would minimize (or maximize) a certain objective function. Such a function, for a single look ahead action (L=1), is given by $$J(u_k) = \mathop{\mathbb{E}}_{z_{k+1}} \{c(P(X_{k+1} | \mathcal{H}_{k+1}^-, z_{k+1}))\}, \quad (5)$$

where the expectation is taken about the random variable $z_{k+1}$ with respect to a propagated belief $P(X_{k+1}|H_{k+1}^-)$ to consider all possible realizations of a future observation $z_{k+1}$.

For notational convenience, the posterior propagated belief, that is, the estimate of the $P(X_{k+1}|H_{k+1}^-, z_{k+1})$ may be written as:

$$b[X_{k+1}] \doteq P(X_{k+1}|H_{k+1}^-, z_{k+1}). \quad (6)$$

Note that, according to Eq. 5, the posterior propagated belief (Eq. 6) should be calculated for each possible value of $z_{k+1}$.

A propagated joint belief is defined herein as:

$$b[X_{k+1}^-] \doteq P(X_{k+1}|H_{k+1}^-) = P(X_k|H_k)P(x_{k+1}|x_k, u_k), \quad (7)$$

from which a marginal belief over a given future pose $x_{k+1}$ can be calculated as $$b[x_{k+1}^-] \doteq \int_{-x_{k+1}} b[X_{k+1}^-]. \quad (8)$$

(As earlier noted, if data association were assumed to be given and perfect, as is commonly assumed in standard BSP, then for each specific value of $z_{k+1}$ there would be a corresponding observed scene $A_i$, and the posterior propagated belief of Eq. 6 may be expressed as $$b[X_{k+1}] = \eta P(X_k|H_k) P(x_{k+1}|x_k, u_k) P(z_{k+1}|x_{k+1}, A_i), \quad (9)$$

which can be represented by a normal distribution, $N(\hat{X}_{k+}, \Sigma_{k+1})$ with appropriate mean $\hat{X}_{k+1}$ and covariance $\Sigma_{k+1}$. The term n is a normalization constant.)

The objective function (Eq. 5) can be evaluated, for a candidate action $u_k$, by calculating a cost function c(.) for each $z_{k+1}$. The optimal action $u_k^*$ may be defined as $$u_k^* = \mathop{\mathrm{argmin}}_{u_k} J(u_k). \quad (10)$$

3. Concepts of DA-BSP Planning and Inference

Figure 2A:
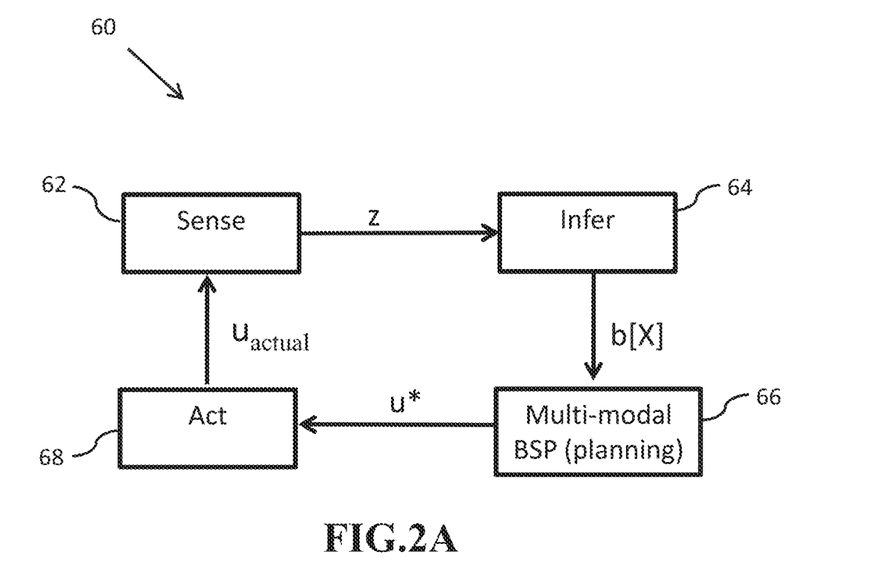
FIG. 2A is a flowchart for steps of determining a robot action, according to an embodiment of the present invention.

The concepts of DA-BSP planning and inference described in the sections below are illustrated in FIG. 2A, which is a flowchart of a process 60, according to an embodiment of the present invention. As indicated, the process includes four steps that may be iterated as a robot performs a task. At a sensing step 62, a robot makes an observation, z, of its environment. The observation may be made with a camera or distance sensor, or any other type of one or more sensors that provides an indication of the robot position and orientation with respect to its surroundings.

Given the observation, z, the robot then makes an inference regarding its pose at a step 64. In some embodiments, the inference is made based on a known map of the environment, which provides a correlation between possible observations and respective possible poses. In an aliased environment, there may be several different poses from which the same observation may be made. Consequently, the actual, true pose of the robot cannot be known, but rather it is possible to infer that the robot is in one of the poses from which the observation z can be made. The belief about the current pose can therefore be inferred to be a mixture probability distribution function, each distinct pdf of the mixture pdf being associated with a particular possible pose.

After making an inference regarding the current pose, the robot, at a belief space planning step 66 plans its next step, typically by optimizing (i.e., minimizing or maximizing) an objective function. In some embodiments, the objective function may be a function that assigns a cost to performing any one of multiple possible control actions u. By comparing the objective function for multiple possible control actions, the robot determines an optimal control action, u*, which is then implemented at a step 68. Each step includes random noise, such that, for example, the actual control action that is implemented, $u_{actual}$, is not identical to the control action planned, u*.

Figure 2B:
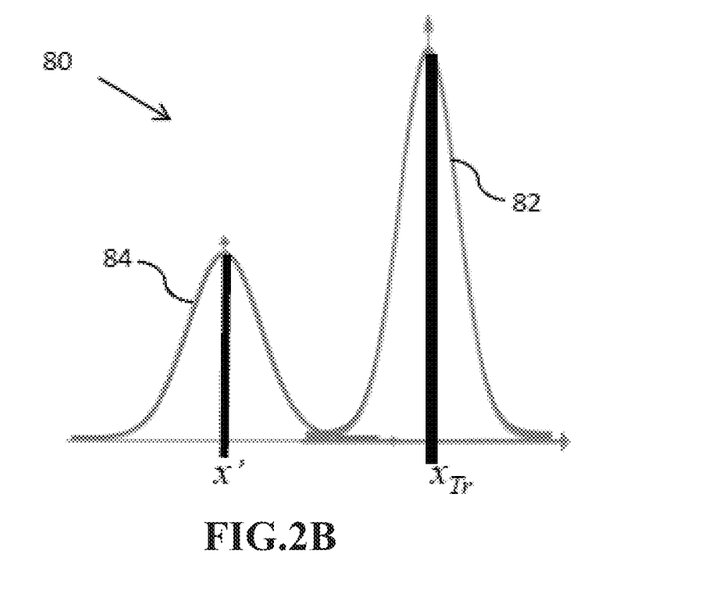
FIG. 2B is a graph of a mixture probability distribution function of a robot pose; according to an embodiment of the present invention.

FIG. 2B is a graph of a mixture pdf of a robot pose; according to an embodiment of the present invention. The mixture pdf includes two pdfs centered around two aliased poses, the first being the true pose, $z_{Tr}$, the second being an aliased false pose, x'.

Note that in DA-BSP both planning and inference consider multi-modal beliefs. Thus, DA-BSP is also capable of handling non-Gaussian distributions in both passive as well as active data associations.

3.1 Data Association while Planning

Given some candidate action (or sequence of actions) and the belief at planning time k, an estimate can be made about a future observation $z_{k+1}$ (e.g. an image) that may be obtained once this action is executed. This future observation is yet to be acquired, and therefore its actual value is unknown. For this reason, the range of all possible values such an observation can assume should be taken into account while evaluating the objective function; hence, the expectation operator in Eq. 5. Writing the expectation operator explicitly transforms Eq. 5 to $$J(u_k) \doteq \int_{z_{k+1}} \overbrace{\mathbb{P}(z_{k+1}|\mathcal{H}_{k+1}^-)}^{(a)} c(\overbrace{\mathbb{P}(z_{k+1}|\mathcal{H}_{k+1}^-, z_{k+1})}^{(a)}) \quad (11)$$

The two terms (a) and (b) in the above equation have intuitive meanings: for each considered value of $z_{k+1}$, (a) represents how likely is it to get such an observation when both the history H of poses and control $u_k$ are known, while (b) corresponds to the posterior belief $b[X_{k+1}]$ from Eq. 6 given this specific observation $z_{k+1}$.

If data association were perfect, each possible observation (i.e., measurement) $z_{k+1}$ would have one corresponding scene $A_i$, as in Eq. 9. However, we assume that it is not possible to know from what future robot pose $x_{k+1}$ an actual observation $z_{k+1}$ will be acquired, because the actual robot pose $x_k$ at time k is unknown and the control is stochastic. Indeed, as a result of action $u_k$, the robot's actual (true) pose $x_{k+1}$ can be anywhere within the propagated belief pdf $b[x_{k+1}^-]$.

In typical cases of perceptual robotics, observations may come from multiple different possible poses of viewing different scenes. As data association is not solved (that is, it is not certain), there are multiple possible scenes or objects that could generate a future observation $z_{k+1}$. In a perceptually aliased environment, there could be several scenes (or objects) that are either completely identical, or have a similar visual appearance when observed from appropriate viewpoints (i.e., poses, while making an observation), which could equally well explain the considered observation $z_{k+1}$. In such a case, there are several possible associations $\{A_i\}$. In these cases the posterior pdf $b[X_k+]$ (term (b) in Eq. 11) becomes a Gaussian mixture pdf with appropriate weights.

3.1.1 Perceptual Aliasing

Intuitively speaking, perceptual aliasing occurs when an object different from the actual one produces the same observation and thereby provides a perceptual alias to the true object. Perceptual aliasing may be either exact or probabilistic. Exact perceptual aliasing of scenes $A_i$ and $A_j$ is defined as $\exists x, x', h(x, A_i) = h(x', A_j)$, and will be denoted in this paper by $\{A_i, A_j\}_{alias}$. In other words, the same nominal (noise-free) observation $\hat{z}$ can be generated by observing different scenes, possibly from different poses (i.e., viewpoints). Such a situation is depicted in FIG. 1A.

A probabilistic perceptual aliasing is a more general form of aliasing, which can be defined as $\exists x, x', |P(z|A_i, x) - P(z|A_j, x')| < \epsilon$ for some small threshold $\epsilon$.

If there is a unique feature in the environment which does not alias with any observation anywhere in the environment and hence allows full disambiguation, whereby all multi-component beliefs are reduced to a single component belief. In DA-BSP we generally assume that only partial disambiguation is available, such that data association, and its ambiguities, require a belief space planning framework.

3.2 Data Association while Perceiving

Inference based on an actual observation is similar to planning, with the key difference being that an observation z is acquired rather than estimated. To estimate a robot pose given an actual observation, z, the actual observation is associated with the scene or object $A_i$ of the mapped environment, giving the association an appropriate observation model term in the posterior pose pdf of Eq. 4.

While the probability of acquiring a specific observation $z_{k+1}$ is represented by the term (a) in Eq. 11, the posterior pdf of the term (b) is conditioned on this specific observation $z_{k+1}$. As such, evaluating the posterior pdf given $z_{k+1}$ involves inference.

The DA-BSP framework can be used to calculate an optimal control action $u_k^*$. This control can then be executed and subsequently inference over new incoming observations can be performed.

Upon execution of the control $u_k^*$ the robot takes an actual observation $z_{k+1}$, which, given the GMM belief $b[X_k]$ (see Eq. 43), can be used to calculate the posterior at time $t_{k+1}$. Whereas within planning at time $t_k$ we considered all possible realizations $\{z_{k+1}\}$ of the future observation $z_{k+1}$, inference is based on a specific observation $z_{k+1}$. Consequently, the posterior in inference is one specific instantiation of the different posteriors $P(X_{k+1}|H_{k+1}^-, z_{k+1})$ already calculated within planning, described in Section 3.1. Thus, similar equations apply.

Consequently, the inference calculation involves propagating the GMM belief based on control $u_k^*$ from $b[X_k]$ to $b[X_{k+1}^-]$ via Eq. 35 and then calculating the posterior GMM $b[X_{k+1}]$ conditioned on the obtained observation $z_{k+1}$ via Eq. 37. The same insights regarding full or partial disambiguation discussed in previous Section 3.1 in the context of planning, apply here as well. Consequently, an optimal action calculated by the former, while considering the ambiguity cost $c_w$, should lead to disambiguation upon execution in inference.

4. Myopic Data-Association Aware Belief Space Planning

Myopic planning is planning with a planning horizon of one simulated control action, or L=1. We need to calculate each of the two terms (a) and (b) in Eq. 11, that is:

$$(a): P(z_{k+1}|H_{k+1}^-), (b): P(X_{k+1}|H_{k+1}^-, z_{k+1}) \quad (12)$$

Term (a) represents the likelihood of obtaining an observation $z_{k+1}$, while within term (b) the observation $z_{k+1}$ is considered as given.

4.1 Computation of Term (a)

Applying total probability over non-overlapping $\{A_N\}$ and marginalizing over all possible robot poses, yields $$\mathbb{P}(z_{k+1} \mid \mathcal{H}_{k+1}^-) \equiv \sum_i \int_x \mathbb{P}(z_{k+1}, x, A_i \mid \mathcal{H}_{k+1}^-) \doteq \sum_i w_i. \quad (13)$$

As seen from the above equation, to calculate the likelihood of obtaining some observation $z_{k+1}$, the likelihood that this observation was generated by a scene $A_i$ is determined for each scene $A_i \in \{A_N\}$. This probability is measured for each scene A by a corresponding weight $w_i$; these weights are then summed to get the actual likelihood of observation $z_{k+1}$. As will be seen below, these weights naturally account for perceptual aliasing aspects for each considered $z_{k+1}$.

Proceeding with the derivation further, using the chain rule gives $$\sum_i w_i = \sum_i \int_x \mathbb{P}(z_{k+1} \mid x, A_i, \mathcal{H}_{k+1}^-) \mathbb{P}(A_i, x \mid \mathcal{H}_{k+1}^-). \quad (14)$$

However, since this integral could be over any arbitrary total distribution of x, the propagated belief $b[_{k+1}^-]$, see Eq. 8, may be applied to compute the integral as:

$$\sum_i w_i = \sum_i \int_x \mathbb{P}(z_{k+1} \mid x, A_i, \mathcal{H}_{k+1}^-) \mathbb{P}(A_i \mid \mathcal{H}_{k+1}^-, x) b[x_{k+1}^- = x]. \quad (15)$$

Thus, $$w_i \doteq \int_x \mathbb{P}(z_{k+1} \mid x, A_i, \mathcal{H}_{k+1}^-) \mathbb{P}(A_i \mid \mathcal{H}_{k+1}^-, x) b[x_{k+1}^- = x]. \quad (16)$$

Here, $P(z_{k+1} | A_i, x, H_{k+1}^-) \equiv P(z_{k+1} | A_i, x)$ is referred to below as the 'measurement likelihood term', which, is derived from the observation model (Eq. 2).

$P(A_i | H_{k+1}^-, x)$ represents the event likelihood, which denotes the probability of scene $A_i$ being observed from viewpoint x. In other words, the event likelihood encodes from what viewpoints each scene $A_i$ is observable and could also model occlusion and additional aspects of observation. The event likelihood terms may be included in the pre-defined model, or mapping, of the environment.

The weights $w_i$ (Eq. 16) naturally capture perceptual aliasing aspects discussed in Section 3.1.1: consider some observation $z_{k+1}$ and the corresponding generative model $z_{k+1} = h(x^{tr}, A^{tr}) + v$ with an appropriate, unknown, true robot pose $x^{tr}$ and scene $A^{tr} \in \{A_N\}$. Clearly, the measurement likelihood $P(z_{k+1} | x, A_i, H_{k+1}^-)$ will be high when evaluated for $A_i = A^{tr}$ and in the vicinity of $x^{tr}$. Note that such a case is necessarily considered, because according to Eq. 13 each scene A. in $\{A_N\}$ is considered separately, and, given $A_i$, all poses x in Eq. 16 are considered. In case of perceptual aliasing, however, there is also another scene(s) $A_j \neq A^{tr}$ which could generate the same observation $z_{k+1}$ from appropriate robot pose x'. Thus, the corresponding measurement likelihood term to $A_j$ will also be high in the vicinity of x'.

However, the actual value of $w_i$ (for each $A_i \in \{A_N\}$) also depends, in addition to the measurement likelihood, on the event likelihood and on the belief $b[x_{k+1}^-]$, with the latter weighting the probability of each considered robot pose. This correctly captures the intuition that those observations z with low-probability poses $b[x_{k+1}^- = x^{tr}]$ will be unlikely to be actually acquired, leading to low value of $w_i$ with $A_i = A^{tr}$. However, the likelihood term (Eq. 13) could still go up in case of perceptual aliasing, where the aliased scene $A_j$ generates a similar observation to $z_{k+1}$ from viewpoint x' with latter being more probable, i.e. high probability $b[x_{k+1}^- = x']$.

In practice, calculating the integral in Eq. 16 can be done efficiently if both the measurement likelihood $P(z_{k+1} | A_i, x, H)$ and the predicted belief $b[x_{k+1}^-]$ are Gaussians since a product of Gaussians remains Gaussian. The integral can then be only calculated for the window where event likelihood is non-zero i.e $P(A_i | x, H) > 0$. In absence of such assumptions, in general, the integral in Eq. 16 should be computed numerically. Since in practical applications $P(A_i | x, H)$ is sparse with respect to z, this computational cost is not severe. For example, for a robot navigating in a two floor environment, even under extreme uncertainty of pose, while reasoning for a scene such as a chair, only the viewpoints from which the chair is observable are considered, instead of the entire belief space.

4.2 Computation of term (b)

The term (b), $P(X_{k+1} | H_{k+1}^-, z_{k+1})$, represents the posterior probability conditioned on observation $z_{k+1}$. This term can be similarly calculated, with a key difference: since the observation $z_{k+1}$ is given, it must have been generated by one specific (but unknown) scene $A_i$ according to the measurement model (Eq. 2). Hence, all scenes are weighted accordingly, with weights ti representing the probability of each scene $A_i$ to have generated the observation $z_{k+1}$.

In both terms (a) and (b) the same weights are obtained, however only in the latter case are the weights normalized such that $\Sigma_i \tilde{w}_i = 1$. Applying total probability over non-overlapping $\{A_N\}$ and chain-rule gives:

$$\sum_i \mathbb{P}(X_{k+1}, A_i \mid \mathcal{H}_{k+1}^-, z_{k+1}) = \quad (17)$$

$$\sum_i \mathbb{P}(X_{k+1} \mid \mathcal{H}_{k+1}^-, z_{k+1}, A_i) \cdot \mathbb{P}(A_i \mid \mathcal{H}_{k+1}^-, z_{k+1}).$$

Here the first term is the posterior belief conditioned on observations, history as well as a candidate scene $A_i$ that supposedly generated the observation $z_{k+1}$. We discuss how this term can be calculated in Section 4.5.

The second term, $P(A_i | H_k, u_k, z_{k+1})$, is merely the likelihood of $A_i$ being actually the one which generated the observation $z_{k+1}$. As will be seen now, this term is actually the normalized weight $w_i$ from Section 4.1. Marginalizing over all robot poses and applying Bayes rule yields $$\mathbb{P}(A_i \mid \mathcal{H}_{k+1}^-, z_{k+1}) = \int_x \mathbb{P}(A_i, x \mid \mathcal{H}_{k+1}^-, z_{k+1}) \quad (18)$$

$$= \eta \int_x \mathbb{P}(z_{k+1} \mid A_i, x, \mathcal{H}_{k+1}^-) \mathbb{P}(A_i, x \mid \mathcal{H}_{k+1}^-), \quad (19)$$

with a normalization constant $\eta \doteq P(z_{k+1} | H_{k+1}^-)$.

Similarly to the derivation in Section 4.1, because this integral may be over any arbitrary total distribution of x, we can use the propagated belief $b[x_{k+1}^-]$, to compute it as:

$$P(A_i | z_{k+1}, H_{k+1}^-) = \eta \int_x P(z_{k+1} | A_i, x, H_{k+1}^-)$$
$$P(A_i | x, H_{k+1}^-) b[x_{k+1}^- = x]. \quad (20)$$

As seen, the same expression is obtained as in Eq. 16, except for the normalization constant η. Hence, $$P(A_i|z_{k+1}, H_{k+1}^-) = \eta w_i \doteq \tilde{w}_i. \qquad (21)$$

In practice, one can avoid calculation of η, and instead normalize the weights $w_i$ such that $\Sigma_i \tilde{w}_i = 1$.

4.3 Summary of Objective Function Terms

To summarize the discussion thus far, we have shown that the objective function (Eq. 11) can be re-written as $$J(u_k) = \int_{z_{k+1}} \left( \sum_i w_i \right) \cdot c\left( \sum_i \tilde{w}_i b[X_{k+1}^{i+}] \right), \qquad (22)$$

with weights $w_i$ and $\tilde{w}_i$ defined in Eq. 16 and Eq. 21, and the posterior given scene $A_i$ defined as $$b[X_{k+1}^{i+}] \doteq P(X_{k+1}|H_{k+1}^-, z_{k+1}, A_i). \qquad (23)$$

It should be noted that for each of the observations $z_{k+1}$, the cost function c(.) is a function of a mixture pdf, weighted by ii, where each component of the mixture pdf is a posterior pdf conditioned on the observation capturing a scene $A_i$. If there is no perceptual aliasing, there will be only one component, with a large weight $\tilde{w}_i$, which corresponds to the correct data association between the observation and scene $A_i$, while the weights of other scene are negligible. On the other hand, in presence of perceptual aliasing, there will be numerous non-negligible weights. In the extreme case, where all scenes (objects) are identical, there will be equal normalized weights $\tilde{w}_i$ for each $A_i \in \{A_N\}$.

The above insights also apply to the unnormalized weights $w_i$ that appear outside of the cost function, from which the likelihood of obtaining observation $z_{k+1}$ is calculated. However, as discussed in Section 4.1, this likelihood is calculated by summing over all such weights ($\Sigma_i w_i$), with each weight properly capturing the likelihood of a measurement $z_{k+1}$ to be generated by scene $A_i$ while taking into account how probable is the corresponding robot pose x given the propagated belief, i.e. $b[x_{k+1}^- = x]$.

For practical purposes, one may thus consider only viewpoints with non-negligible probability according to $b[x_{k+1}^-]$. Moreover, thresholds may be set (i.e., predefined) to ignore weights less than the thresholds in the mixture $\Sigma_i \tilde{w}_i b[X_{k+1}^{i+}]$, instead of always considering all scenes $\{A_N\}$. Data association within belief space planning thus leads to Eq. 22.

4.4 Simulating Future Observations $\{z_{k+1}\}$ Given $b[X_{k+1}^-]$

Calculating the objective function (Eq. 22) for each candidate action $u_k$ involves considering all possible realizations of $z_{k+1}$. One approach to perform this in practice, is to simulate future observations $\{z_{k+1}\}$ given a propagated belief $b[X_{k+1}^-]$, scenes $\{A_N\}$ and an observation model (Eq. 2). One can then evaluate Eq. 22 considering all observations in the set $\{z_{k+1}\}$.

This concept can be realized as follows. First, viewpoints $\{x\}$ are sampled from $b[X_{k+1}^-]$. For each viewpoint $x \in \{x\}$, an observed scene $A_i$ is determined according to event likelihood $P(A_i|H_k, x)$. Together, x and $A_i$ are then used to generate nominal $\hat{z} = h(z, A_i)$ and noise-corrupted observations $\{z\}$ according to the observation model (Eq. 2): $z = h(z, A_i) + v$. The set $\{z_{k+1}\}$ is then the union of all such generated observations $\{z\}$. In other words, given a simulated observation, the DA-BSP approach determines the possible associations to mimic reality. Sensors (e.g., cameras) provide only an observation but not the corresponding association. Consequently, the DA-BSP approach simulates the possible/likely/future observations and then reasons about the data association for each. This process of simulating/generating likely observations goes through a generative model, i.e. an observation is generated based on a specific scene (e.g., landmark or object) and a camera pose. Knowledge of the scene is used to generate the observation, but not when calculating the integrand in Eq. 22.

4.5 Computation of Mixture of Posterior Beliefs $\Sigma_i \tilde{w}_i b[X_{k+1}^{i+}]$ As seen from Eq. 22, reasoning about data association aspects results in a mixture of posterior pdfs within the cost function c(.), i.e. $\Sigma_i \tilde{w}_i b[X_{k+1}^{i+}]$, for each possible observation $z_{k+1} \in \{z_{k+1}\}$. The set of observations $\{z_{k+1}\}$ is simulated as discussed in Section 4.4; however, one could also consider treating a future observation $z_{k+1}$ as a random variable.

Hereinbelow, posterior pose pdfs are calculated given some specific observation $z_{k+1} \in \{z_{k+1}\}$. For simplicity, the belief at a planning time k is assumed to be a Gaussian $b[X_k] = N(\hat{X}_k, \Sigma_k)$. However, the approach could also be applied to a mixture of Gaussians.

Each of the components $b[X_{k+1}^{i+}]$ in the mixture pdf may be written as $$b[X_{k+1}^{i+}] \propto b[X_k] P(x_{k+1}|x_k, u_k) P(z_{k+1}|x_{k+1}, A_i). \qquad (24)$$

The above belief is a Gaussian and its first two moments (according to MAP inference) are:

$$b[X_{k+1}^{i+}] = N(\hat{X}_{k+1}^i, \Sigma_{k+1}^i), \qquad (25)$$

with mean $\hat{X}_{k+1}^i$ and covariance $\Sigma_{k+1}^i$.

The mixture of posterior beliefs in the cost function c(.) from Eq. 22 is now a mixture of Gaussians:

$$\sum_i \tilde{w}_i b[X_{k+1}^{i+}] = \sum_i \tilde{w}_i N\left( \hat{x}_{k+1}^i, \sum_{k+1}^i \right). \qquad (26)$$

The corresponding mean and covariance of a general Gaussian mixture pdf $p(x) = \Sigma_{j=1}^n w_j N(\hat{x}_j, \Sigma_j)$ are given by Bar-Shalom, Yaakov, et al., Estimation with applications to tracking and navigation: theory algorithms and software, (John Wiley & Sons, 2001):

$$\hat{x} = \sum_{j=1}^n w_j \hat{x}_j, \quad \Sigma = \sum_{j=1}^n w_j \Sigma_j + \tilde{\Sigma}, \qquad (27)$$

$$\text{with } \tilde{\Sigma} = \sum_{j=1}^n w_j (\hat{x}_j - \hat{x})(\hat{x}_j - \hat{x})^T.$$

Thus, in cases where combination of the posterior pdfs (Eq. 25) makes sense, the overall combined belief can be collapsed to a Gaussian distribution according to Eq. 27.

4.6 Uncertain Scene

The above analysis assumes that scenes are known fairly well i.e., $A_i$ is known with little uncertainty. This however might not be true in practice, for example when such scenes arise out of a previous simultaneous localization and mapping (SLAM) session. In such a scenario, it is more appropriate to consider the uncertainty of $A_i$ also within the DA-BSP framework. This implies that Eq. 20 should incorporate the actual model of variation of $A_i$. More precisely, $$P(A_i|x,H_{k+1}^-)=N(\hat{x}_{A_i},\Sigma_{A_i}) \quad (28)$$

where $\hat{x}_{A_i}$ is the nominal position around which the scene $A_i$ is distributed while $\Sigma_{A_i}$ is the covariance. Hence:

$$P(A_i|z_{k+1},H_{k+1}^-)=\eta_x\int P(z_{k+1}|A_i,x,H_{k+1}^-) \\ N(\hat{x}_{A_i},\Sigma_{A_i})b[x_{k+1}^-=x] \quad (29)$$

Considering that the prior (and hence also propagated) belief is a Gaussian, the observation likelihood (i.e., $P(z_{k+1}|A_i,x,H_{k+1}^-)$) is a Gaussian too. By uncertain $A_i$, we mean that the position from where $A_i$ can be viewed is uncertain, and not the class of the scene itself. Therefore, the observation model can be applied to compute the term $P(z_{k+1}|A_i,x,H_{k+1}^-)$. Furthermore, under a maximum likelihood assumption, this observation is distributed normally around the most likely observation $\hat{z}_{k+1}^{ml}$. Therefore the right-hand side of the equation can be reduced to a single Gaussian. In other words, the weights $w_i$ used in Eq. 16 and Eq. 21, can be computed efficiently through analytical approach.

Similarly, when the propagated belief $b[x_{k+1}^-=x]$ is a mixture of Gaussians (i.e., GMM), the expression on the left-hand side of Eq. 29 yields another mixture of Gaussians, with the same number of modes. Here too, computation could be performed analytically, by iterating over each Gaussian component. Obviously, the ease of computation of $w_i$ is afforded not by the fact that $A_i$ is uncertain, but that its uncertainty is of a specific structure (namely, a Gaussian distribution).

4.7 Designing a Specific Cost Function

The treatment so far has been agnostic to the structure of the cost function c(.). Recalling Eq. 22, the belief over which the cost function is defined is multi-modal, that is, it has multiple components. Standard cost functions in literature typically include terms such as control usage $c_u$, distance to goal $c_G$ and uncertainty $c_\Sigma$.

Because the posterior belief is multi-modal and represented as a mixture of Gaussian distributions $\Sigma_i\tilde{w}_i N(\hat{X}_{k+1}^i, \Sigma_{k+1}^i)$, see Eq. 26, several different cost structures may be defined depending on the treatment of the different modes. Two particular such costs are to take the worst-case covariance among all covariances $\Sigma_{k+1}^i$ in the mixture, e.g. $\Sigma=\max_i\{tr(\Sigma_i)\}$, or to collapse the mixture into a single Gaussian $N(.,\Sigma)$ according to Eq. 27. In both cases, the cost may be defined due to uncertainty as $c_\Sigma=trace(\hat{\Sigma})$.

The cost due to ambiguity, $c_w$, should penalize ambiguities such as those arising out of perceptual aliasing. The non-negligible weights w in Eq. 22 arise due to perceptual aliasing with respect to any scene $A_i$, whereas in case of no aliasing, all but one of these weights are zero. In most severe case of aliasing (all scenes or objects $A_i$ are identical), all of these weights are comparable among each other. Thus by the Kullback-Leibler divergence $KL_u(\{\hat{w}_i\})$ of these weights $\{\tilde{w}_i\}$ from a uniform distribution to penalize higher aliasing, we may define $$c_w(\{\tilde{w}_i\}) \doteq \frac{1}{KL_u(\{\tilde{w}_i\})+\epsilon}$$

where $\epsilon$ is a small number to avoid division by zero in case of extreme perceptual aliasing.

The overall cost then can be defined as a combination $$c\doteq M_u c_u + M_G c_G + M_\Sigma c_\Sigma + M_w c_w, \quad (30)$$

with user-defined weights $M_u$, $M_G$, $M_\Sigma$ and $M_w$.

4.8 Formal Algorithm for Myopic DA-BSP

Figure 3:
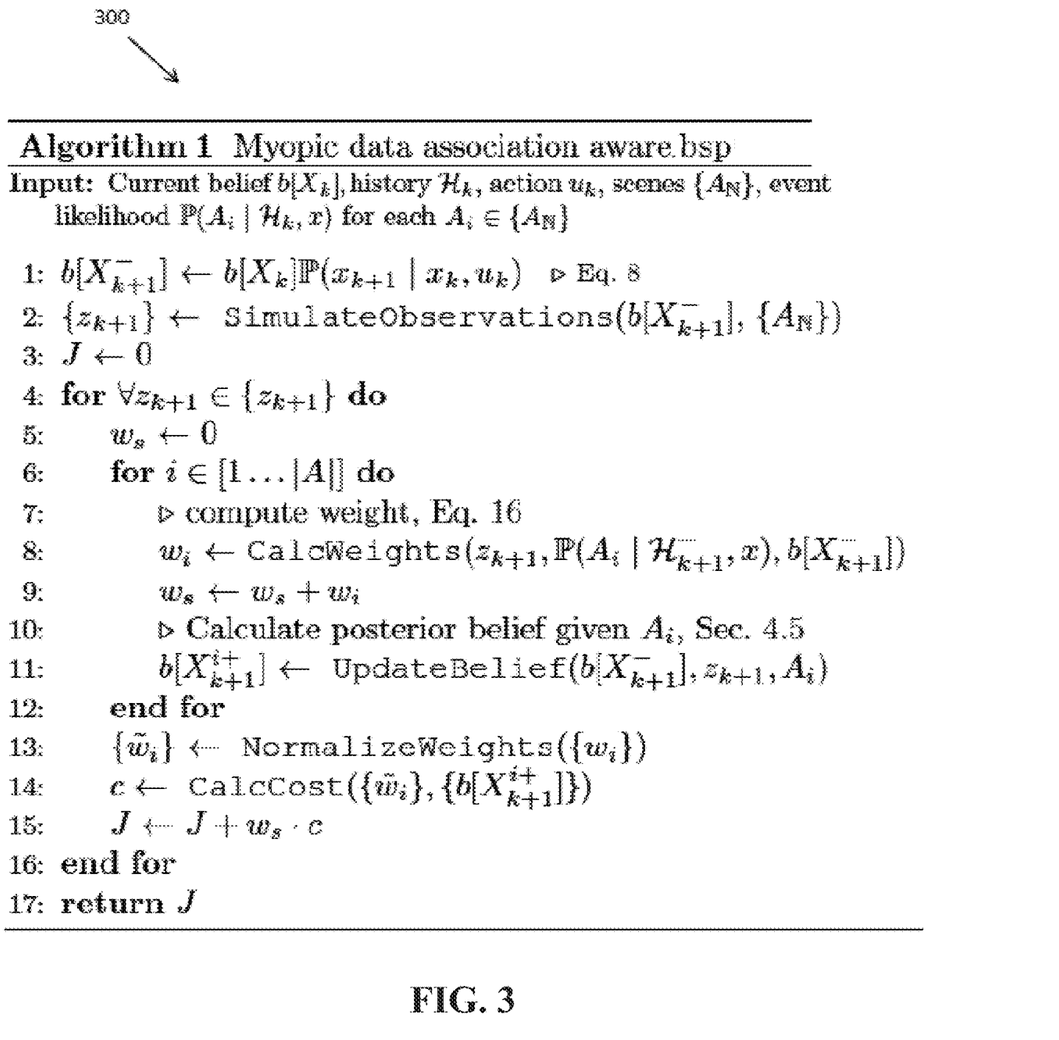
FIG. 3 shows an algorithm for calculating an objective function that represents an estimated cost of a robot control action based on myopic data association belief space planning, according to an embodiment of the present invention.

FIG. 3 shows a table 300 with an algorithm 1 for calculating an objective function. The objective function represents an estimated cost of a robot control action, based on myopic data association belief space planning, according to an embodiment of the present invention.

Given belief $b[X_k]$ and candidate action $u_k$, the belief is propagated under a simulated control action to give a joint belief (over the future pose $X_{k+1}$) as $b[X_{k+1}^-]$. Simulated future observations are then generated $\{z_{k+1}\}$ (step 2), as described in Section 4.4.

The algorithm then calculates the contribution of each observation $z_{k+1}\in\{z_{k+1}\}$ to the objective function (Eq. 22). In particular, at steps 8 and 11 weights $w_i$ and the posterior beliefs $b[X_{k+1}^{i+}]$ are calculated for each aliased scene $A_i\in\{A_N\}$ that is associated with each observation. These calculations are according to Sections 4.1 and 4.5.

After weight normalization, at step 13, the cost c(.) (step 14) for each observation is calculated and, using the accumulated unnormalized weights $w_s \equiv \Sigma_i w_i$, the value of the objective function J is updated with the weighted cost $z_{k+1}$ (step 15).

5. Non-Myopic Data-Association Aware Multi-Modal BSP

Here we generalize the DA-BSP that was developed in the previous section. We start with considering a prior belief which is non-Gaussian. In particular, we assume a prior belief to be a mixture of Gaussians and then follow a similar approach to compute belief update and perform myopic planning as done earlier. Once this is done and we have an approach that takes in a GMM belief and updates to another GMM belief, we present the most general DA-BSP in a non-myopic setting of several look ahead actions of planning.

5.1 Prior Belief as a Mixture of Gaussian Equations

First, assume a belief at time k is a linear combination of $M_k\in N$ Gaussians i.e., $$b[X_k] \doteq \mathbb{P}(X_k|\mathcal{H}_k^-, z_k) = \sum_{i=1}^{M_k} \xi_{k,i} \mathcal{N}(\hat{X}_{k,i}, \Sigma_{k,i}) \quad (31)$$

Since the motion model (see Eq. 3) is still a Gaussian, the propagated belief is also a GMM with $M_k$ components. More precisely, $$b[X_{k+1}^-] \doteq \quad (32)$$

$$\mathbb{P}(X_{k+1}|H_{k+1}^-) = \mathbb{P}(X_k|H_k)\mathbb{P}(x_{k+1}|x_k,u_k) = \sum_{i=1}^{M_k} \xi_{k,i}\mathcal{N}(\hat{X}_{k+1,i}^-, \Sigma_{k,i}^-)$$

Once the observation $z_{k+1}$ is obtained, for each of the $M_k$ components, we can consider all the aliased scenes $\{A_N\}$. The derivation is very similar along the lines of the discussion in the previous Section, with additional parameters introduced. For clarification, we reproduce Eq. 15 which was determined by applying the chain rule and subsequent marginalization over all x and $A_i \in \{A_N\}$.

$$\sum_i^{|A_N|} \int_x \mathbb{P}(z_{k+1} | x, A_i, \mathcal{H}_{k+1}^-) \mathbb{P}(A_i | \mathcal{H}_{k+1}^-, x) b[x_{k+1}^- = x]. \text{ Thus,}$$

$$w_i \doteq \int_x \mathbb{P}(z_{k+1} | x, A_i, \mathcal{H}_{k+1}^-) \mathbb{P}(A_i | \mathcal{H}_{k+1}^-, x) b[x_{k+1}^- = x].$$

Since the propagated belief (see Eq. 32), from which $b[x_{k+1}^-]$ is calculated, is also a GMM, we can replace $b[x_{k+1}^- = x]$ with $$b[x_{k+1}^- = x] = \sum_{j=1}^{M_k} \xi_{k+1,j} b[x_{k+1,j}^- = x]. \tag{33}$$

However, the actual value of $w_i$ (for each $A_i \in \{A_N\}$) depends, in addition to the measurement likelihood and event likelihood, also on the GMM belief $b[z_{k+1}^-]$, with the latter weighting the probability of each considered robot pose z. This correctly captures the intuition that those observations z with low-probability poses $b[x_{k+1}^- = x'']$ will be unlikely to be actually acquired, leading to low value of $w_i$ with $A_i = A^r$. Since $b[x_{k+1}^-]$ is a GMM with $M_k$ components, low-probability pose z corresponds to low probabilities $b[x_{k+1}^{j-} = x'']$ for each component $j \in \{1, \ldots, M_k\}$. However, the likelihood term (Eq. 13) could still go up in case of perceptual aliasing, where the aliased scene $A_j$ generates a similar observation to $z_{k+1}$ from viewpoint x' with latter being more probable, i.e. high probability $b[x_{k+1}^- = x']$.

In practice, calculating the integral in Eq. 16 can be done efficiently considering separately each component of the GMM $b[x_{k+1}^-]$. Each such component is a Gaussian that is multiplied by the measurement likelihood $P(z_{k+1}|A_i, x, H)$ which is also a Gaussian and it is known that a product of Gaussians remains a Gaussian. The integral can then be only calculated for the window where event likelihood is non-zero i.e $P(A_i|x, H) > 0$. For general probability distributions, the integral in Eq. 16 should be computed numerically. Since in practical applications $P(A_i|x, H)$ is sparse with respect to x, this computational cost is not severe.

For example, for a robot navigating in a two floor environment, even under extreme uncertainty of pose, while reasoning for a scene such as a chair, we would only consider the viewpoints from which the latter is observable, instead of the entire belief space.

Similarly for the term (b), $P(X_{k+1}|H_{k+1}^-, z_{k+1})$, applying total probability over non-overlapping $\{A_N\}$ as well as all the components of the propagated belief, we get:

$$\mathbb{P}(X_{k+1} | \mathcal{H}_{k+1}^-, z_{k+1}) = \sum_{j=1}^{M_k} \sum_{i=1}^{|A_N|} \mathbb{P}(X_{k+1}, A_i, \gamma = j | \mathcal{H}_{k+1}^-, z_{k+1}) \tag{34}$$

Proceeding as before, we split the term inside the summation using the chain rule as follows:

$$P(X_{k+1}, A_i, \gamma = j | H_{k+1}^-, z_{k+1}) = P(X_{k+1} | H_{k+1}^-, z_{k+1}, A_i, \gamma = j) \cdot P(A_i, \gamma = j | H_{k+1}^-, z_{k+1})$$

The first term is the posterior obtained with the scene $A_i$ while considering the j-th propagated belief component and we denote this by $b[X_{k+1}^{j+}|A_i]$.

For the second term, we again apply the chain rule, to obtain:

$$P(A_i, \gamma = j | H_{k+1}^-, z_{k+1}) = P(A_i | \gamma = j, H_{k+1}^-, z_{k+1}) \cdot P(\gamma = j | H_{k+1}^-, z_{k+1})$$

Here, $P(\gamma = j | H_{k+1}^-, z_{k+1})$ is equal to (k which is the weight of the j-th component of the prior belief. For the first term, we marginalize over all z to obtain the weights $\tilde{w}_{k+1}^{ij}$. This is identical to marginalization done in the previous Section (see Eq. 21) with the only difference that here all z considered are from the $j^{th}$ component of the belief.

$$b[X_{k+1}] = \sum_{j=1}^{M_k} \sum_{i=1}^{|A_N|} \xi_k^j \mathbb{P}(A_i | \mathcal{H}_{k+1}^-, z_{k+1}, \gamma = j) b[X_{k+1}^{j+} | A_i]. \tag{35}$$

$$\tilde{w}_{k+1}^{ij} \doteq \eta' \int_x \mathbb{P}(z_{k+1} | A_i, x, \mathcal{H}_{k+1}^-) \mathbb{P}(A_i | \mathcal{H}_{k+1}^-, \gamma = j, x) b[x_{k+1}^{j-} = x], \tag{36}$$

with $\eta' = 1/P(z_{k+1}|H_{k+1}^-)$. Note that for each component j, $\Sigma_i \tilde{w}_{k+1}^{ij} = 1$. Finally, we can re-write Eq. 35 as $$\mathbb{P}(X_{k+1} | \mathcal{H}_{k+1}^-, z_{k+1}) = \sum_{r=1}^{M_{k+1}} \xi_{k+1}^r \mathbb{P}(X_{k+1} | \mathcal{H}_{k+1}, \gamma = r), \tag{37}$$

or in short, $b[X_{k+1}] = \sum_{r=1}^{M_{k+1}} \xi_{k+1}^r b[X_{k+1}^{r+}]$, where $$\xi_{k+1}^r \doteq \xi_{k+1}^{ij} \doteq \xi_k^j \tilde{w}_{k+1}^{ij}, b[X_{k+1}^{r+}] \doteq b[X_{k+1}^{j+} | A_i]. \tag{38}$$

The result is a new GMM with $M_{k+1}$ components, where each component $r \in [1, M_{k+1}]$, with appropriate mapping to indices (i, j) from Eq. 35, is represented by weight $\tau_{k+1}^r$ and posterior conditional belief $b[X_{k+1}^{r+}]$. The latter can be evaluated as the Gaussian $$b[X_{k+1}^{r+}] \propto b[X_{k+1}^{j-}] P(z_{k+1}|x_{k+1}, A_i) = \mathcal{N}(\hat{X}_{k+1}^r, \Sigma_{k+1}^r), \tag{39}$$

where the mean $\hat{X}_{k+1}^r$ and covariance $\Sigma_{k+1}^r$ can be efficiently recovered via MAP inference.

5.2 Non-Myopic Planning

It is easy to see that once the prior as well as the posterior belief are represented as a mixture of Gaussians, we can extend the DA-BSP to a non-myopic framework, for planning over a horizon of L actions. Starting with a multi-modal prior belief and a control sequence $u_{0:L-1}$, the planning would involve reasoning about the plausible data associations at each intermediate $l \in [1, L-1]$ action. To make it more concrete, consider a non-myopic cost function as:

$$J(u_{k:k+L-1}) = \int_{z_{k+1:k+L}} \sum_{l=1}^{L} \overbrace{\mathbb{P}(z_{k+l} | \mathcal{H}_{k+l}^-)}^{(a)} c_l(\overbrace{\mathbb{P}(X_{k+l} | \mathcal{H}_{k+l}^-, z_{k+l})}^{(b)}) \tag{40}$$

where the expectation over future observations is written explicitly, accounting for all possible realizations of these unknown observations. The history $H_{k+1}^-$ includes future observations $z_{k+1:k+l-1}$ up to the lth look ahead action.

Similar to the myopic case in Section 4, the two terms (a) and (b) in Eq. 40 have an intuitive meaning: for each considered value of $z_{k+l}$, (a) represents how likely is it to get such an observation, while (b) corresponds to the posterior belief given this specific $z_{k+l}$. However, the difference in a non-myopic case is that both terms are conditioned on the history $H_{k+l}^-$ which is a function of $z_{k+1:k+l-1}$; hence, the above reasoning is valid for all possible realizations of $z_{k+1:k+l-1}$ and the corresponding posterior beliefs $\mathbb{P}(X_{k+l-1}|H_{k+l-1})$.

It is not difficult to show that the posterior at each time k is the GMM $$\mathbb{P}(X_{k+l} | \mathcal{H}_{k+l}^-, z_{k+l}, A_i) = \sum_{j=1}^{M_{k+l-1}} \xi_{k+l-1}^j b[X_{k+l}^{j+} | A_i], \quad (41)$$

where $b[X_{k+l}^{j+}|A_i] \doteq \mathbb{P}(X_{k+l}|H_{k+l}^-, \gamma=j, A_i, z_{k+l})$ is the posterior of the jth GMM component of the propagated belief $b[X_{k+l}^-]$.

Plugging-in Eq. 41 into $\mathbb{P}(X_{k+l}|H_{k+l}^-, z_{k+l}) = b[X_{k+l}]$ from Eq. 9 yields:

$$b[X_{k+l}] = \sum_{i=1}^{|A_N|} \sum_{j=1}^{M_{k+l-1}} \xi_{k+l-1}^j \mathbb{P}(A_i | \mathcal{H}_{k+l}^-, z_{k+l}) b[X_{k+l}^{j+} | A_i]. \quad (42)$$

Accounting for $b[x_{k+l}^{j-}]$ for each considered jth component as $\mathbb{P}(A_i|H_{k+l}^-, z_{k+l}) = f_x \mathbb{P}(A_i, x|H_{k+l}^-, z_{k+l})$, and applying Bayes' rule yields $$\tilde{w}_{k+l}^{ij} \doteq \eta'_x f P(z_{k+l}|A_i, x, H_{k+l}^-) P(A_i|H_{k+l}^-, x) b[x_{k+l}^{j-} = x], \quad (43)$$

with $\eta' = 1/P(z_{k+l}|H_{k+l}^-)$. Note that for each component j, $\Sigma_i \tilde{w}_{k+l}^{ij} = 1$. Finally, we can re-write Eq. 35 as $$b[X_{k+l}] = \sum_{r=1}^{M_{k+l}} \xi_{k+l}^r \mathbb{P}(X_{k+l} | \mathcal{H}_{k+l}, \gamma = r) = \sum_{r=1}^{M_{k+l}} \xi_{k+l}^r b[X_{k+l}^{r+}], \quad (44)$$

where $\xi_{k+l}^r \doteq \xi_{k+l-1}^j \tilde{w}_{k+l}^{ij}$ and $b[X_{k+l}^{r+}] = \mathbb{P}(X_{k+l}|H_{k+l}, \gamma=r)$.

The result is a new GMM with $M_{k+l}$ components, where each component $r \in [1, M_{k+l}]$, with appropriate mapping to indices (i, j) from Eq. 35, is represented by weight $\xi_{k+l}^r$ and posterior conditional belief $b[X_{k+l}^{r+}]$. The latter can be evaluated as the Gaussian $b[X_{k+l}^{r+}] = N(\hat{X}_{k+l}^r, \Sigma_{k+l}^r)$, with mean $\hat{X}_{k+l}^r$ and covariance $\Sigma_{k+l}^r$.

The associated cost of the overall posterior of this L look ahead action planning can then be compared with that of similar posterior of other control action, to permit selection of an optimal single action. After the action is taken and a real observation is obtained, the inference over this observation allows us to update the posterior which then serves as a prior belief pdf for a next stage L of action planning. A naïve implementation of such planning might suffer from problems of dimensionality and of history. DA-BSP provides a principled way to strike a balance between a requirement of an efficient solution and not losing the correct data association in a challenging aliased environment.

5.3 Overall Algorithm

Figure 4:
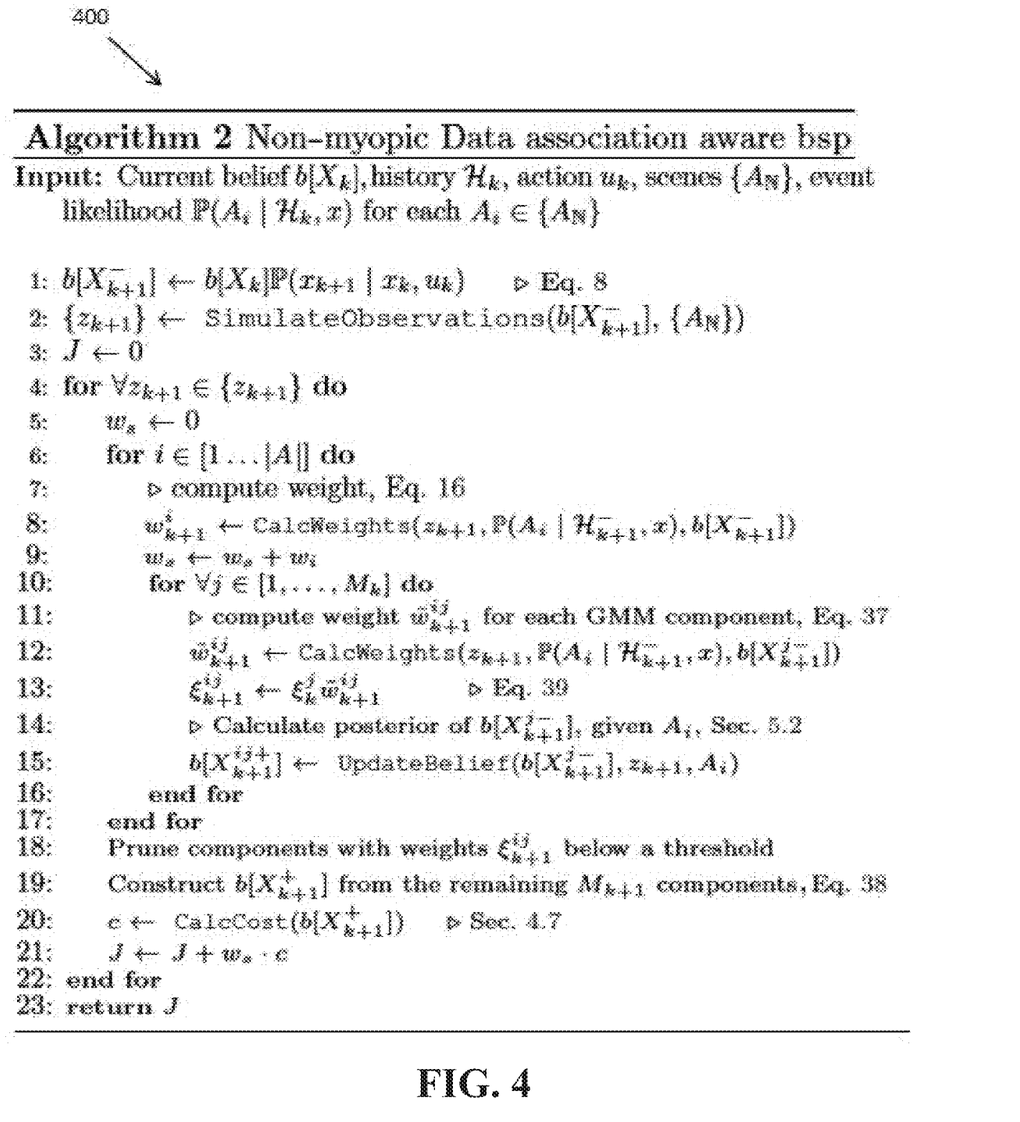
FIG. 4 shows an algorithm for calculating an objective function that represents an estimated cost of a robot control action based on non-myopic data association belief space planning, according to an embodiment of the present invention.

FIG. 4 shows a table 400 with an algorithm 2 for calculating an objective function that represents an estimated cost of a robot control action. The algorithm 2 is based on non-myopic data association belief space planning, according to an embodiment of the present invention. The first steps of the algorithm 2 are the same as for algorithm 1, described above in section 4.8.

Given a GMM belief $b[X_k]$ and candidate action $u_k$, we first propagate the belief to get $b[X_{k+1}^-]$ and then simulate future observations $\{z_{k+1}\}$ (step 2), as described in Section 4.4. The algorithm then calculates the contribution of each observation $z_{k+1} \in \{z_{k+1}\}$ to the objective function (Eq. 22). In particular, at steps 8 and 9, the algorithm calculates the weights $w_{k+1}^i$ that are used in evaluating the likelihood $w_s$ of obtaining observation $z_{k+1}$. At steps 10-16, the algorithm computes the posterior belief: this involves updating each jth component from the propagated belief $b[X_{k+1}^{j-}]$ with observation $z_{k+1}$, considering each of the possible scenes $A_i$. After pruning (step 18), this yields a posterior GMM with $M_{k+1}$ components. The algorithm then evaluates the cost c(.) (step 20) and use $w_s$ to update the value of the objective function J with the weighted cost for measurement $z_{k+1}$ (step 21).

According to Eq. 42, each of the $M_k$ components from the belief at a previous time, is split into $|A_N|$ new components with appropriate weights. This would imply an explosion in the number of components. However, in practice, the majority of the weights will be negligible, i.e., less than a preset threshold, and therefore can be pruned, while the remaining number of components is denoted by $M_{k+1}$ in Eq. 37.

5.4 Effect of Reducing a Mixture of Belief

The components of DA-BSP, when considering all the possible data associations, grow exponentially. Using a discrete case as an example, it is easy to show that, under a reasonable assumption that scene space is much smaller than state space, this problem does not deteriorate the complexity of the underlying problem. Moreover, it is important to notice that each association is accompanied with the weights, which reflect the significance of each a data association. In particular, if a scene is quite unique, it is unlikely to be aliased with any other, and consequently only the posterior conditioned on this correct association would have significant weight. A simple threshold-based pruning is then sufficient to discard insignificant modes.

The objective of curtailing the complexity of data-structure through some pruning heuristics is not a novel approach. Even in the context of data-association, it occurs in a slightly different form when the problem is posed as a multi-hypothesis tracking (MHT). In such a scenario, when planning is through explicit instantiation of the trajectory of control and pruning decisions are based on information-theoretic values, a particular branch is expected to hold. Thus MHT can handle a passive case of BSP where disambiguation is sought after only the inference stage and not during planning. In contrast, DA-BSP provides data-association within the BSP framework and thus can utilize weights that are shaped by actual future associations.

we can harness similar approaches to curtailing the empirical complexity of DA-BSP, classifying the approaches as local or global and pruning or merging. When the decision about how to reduce a given mode in DA-BSP is based on overall likelihood of associations considered from the initial position, this may be considered a global decision. A local decision is one in which local information of the conditional posterior pdf is sufficient to decide whether to reduce modes via merging or pruning. Pruning is the process of dropping a component in a conditional posterior pdf and re-normalizing the other weights, whereas merging is the process of combining two components to form a single component, which may be an optimal representation of both components. Both pruning and merging may be recursive processes.

5.5 Full Vs. Partial Disambiguation

In the context of selecting an appropriate horizon for planning, it may be noted that the greater the horizon, the greater the likelihood to have a unique observation that results in disambiguation between several or all components of a belief. However, in general, DA-BSP does not require a complete (i.e., full) disambiguation for its correctness. As described in Section 3.1, full disambiguation means that the posterior belief pdf has only a single component. For typical forward L planning, this can not be guaranteed unless there is a unique observation in the future. At best, there would be partial disambiguation, i.e., some components of the posterior belief may vanish due to less aliased observations. When full disambiguation does not occur within the planning horizon, DA-BSP maintains all the components with appropriate weights. This allows for partial disambiguation in a planning scenario where only the aliased components remain in the posterior belief, and may result in full disambiguation eventually.

5.6 Degenerate Cases of DA-BSP

Two prominent advantages of DA-BSP are that it accurately handles pose uncertainty, when an observation may no longer be associated with a nominal pose and, secondly, that it is a generalization of usual BSP. BSP is a degenerate case of data-association aware BSP in three situations: without pose uncertainty, with data-association solved, and without perceptual aliasing.

Without pose uncertainty: If the pose is known with certainty, the belief is a Dirac pulse around the nominal $\hat{x}_k$. Since the scene-space could still be uncertain, belief space planning should consider all possible scenes being observed. However, in this case, the integral in Eq. Eq. 36 reduces to a single term. In a more realistic case of small variance in the pose, considering only the most likely data association may still lead to reasonable performance. This is similar to many passive inference based approaches where the most likely component is often sufficient to account for the overall posterior. It should be noted that when significant pose uncertainty exists and yet it is not assumed to be so, an incorrect inference can be made, that is, a conclusion is made that the robot is observing an aliased scene rather than the true scene.

With data-association solved: In this case, the scene that is captured from perspective $x_{k+1}$ when observation $z_{k+1}$ is obtained, is known. More precisely $$\exists t, \mathbb{P}(z_{k+1} | x_{k+1}, A_j) = \begin{cases} 1 & j = t \\ 0 & j \neq t \end{cases}$$

This implies that the summation over all $\{A_N\}$ is reduced to a single $A_t$, known a-priori for each observation $z_{k+1}$. Therefore, with data association solved, the framework degenerates to the usual BSP.

Without perceptual aliasing: In the absence of perceptual aliasing, while considering the observation $z_{k+1}$, we are guaranteed to have only a single pose and scene pair $(z_{k+1}, A_j)$ that generated it. This implies that if the observation $z_{k+1}$ were given, the posterior beliefs would be all zero except the one corresponding to $A_j$. However, since while planning at an increment k, the observation $z_{k+1}$ is an unknown random variable, we would still need to consider all possible events $\{A_N\}$, that generated it.

5.7 Complexity and Correctness of Non-Myopic DA-BSP

BSP can be framed as a partially observable Markov decision problem (POMDP). In a general infinite horizon case, POMDP is undecidable, whereas for a finite horizon polynomial in |S|, it is known to be PSPACE-complete. DA-BSP performs belief space planning under uncertain data association, and must therefore incorporate all scalability issues involved in solving any POMDP. Here, a discrete state POMDP is considered.

The POMDP may be represented by tuple $\langle S, A, \Omega, T, O, r, b_0 \rangle$ and furthermore, the index i may represent the time-epoch at which decisions regarding control actions are executed. L is the horizon of the problem i.e., $i \in \{j | 1 \leq j \leq L, j \in \mathbb{N}\}$. The tuple symbols stand for:

S: set of unobservable states the system can possible transit into; $\forall i, x_i \in S$
A: set of all admissible control actions the system can perform; $\forall i, u_i \in A$
$\Omega$: set of all possible observations that can be obtained; $\forall i, z_i \in \Omega$
T: transition function denoting probability of transiting from a state x to state x' under action u; $T: S \times A \times S \mapsto R_{[0,1]}$
O: observation function denoting the probability of observation z under action u; $O: S \times A \times \Omega \mapsto R_{[0,1]}$
r: reward function for calculating reward in each state x and action u; $T: S \times A \mapsto R \setminus \{-\infty, \infty\}$
$b_0$: initial belief; probability distribution over whole state-space S Because at any time increment k, the actual underlying state is unknown, the system should reason about probability distribution over all states. The belief of being in state x, is represented as b(x). After each observation this belief is updated as:

$$b^{u,z}(x') = \frac{O(x', u, z)}{\mathbb{P}(z | u, b)} \cdot \sum_{x \in S} T(x, u, x') b(x) \tag{45}$$

which implies:

$$b^{u,z}(x') \propto O(x', u, z) \cdot \sum_{x \in S} T(x, u, x') b(x) \tag{46}$$

Note that in the notations introduced in this paper, this can be written as:

$$b[X_{k+1} | z_{k+1}, u_k] \propto P(z_{k+1} | x_{k+1}, u_k) \cdot \int_{x_k} P(x_{k+1} | x_k, u_k) P(x_k) \tag{47}$$

Visualizing Eq. Eq. 46 as system of equations in |S| variables (denoted by b(x)), we can see that each such update requires $O(|S|^2)$ computational effort, where O stands for big-O notation.

When data-association is not solved, such a belief update must be made against each possible data association, hence:

$$b[X_{k+1} | A_i, z_{k+1}, u_k] \propto \mathbb{P}(z_{k+1} | A_i, x_{k+1}, u_k) \cdot \int_{x_k} \mathbb{P}(x_{k+1} | x_k, u_k) \mathbb{P}(x_k) \tag{48}$$

Consequently, a data-association aware belief update would require $O((|S||E|)^2)$ computational effort, where E is the set of all events $\{A_N\}$. Assuming the finite horizon of size L, the overall complexity of the problem is $O((|O||A|)^L (|S||E|)^2)$. Finally, we also note that in practical applications $|E| \ll |S|$.

In order to reason about the correctness of DA-BSP, it may first be noted that whenever there is a single disambiguating data association, the algorithm recognizes it and thus associates the observation correctly. DA-BSP adjusts the subsequent weights of the components based on likelihood of the observation. An 'unpruned' DA-BSP considers all such associations no matter how small the weights, provided they are non-zero, whereas pruned DA-BSP has some reasonable threshold below which all of the weights are pruned away. For unpruned DA-BSP, consider that at a time increment $k \in [1, \infty)$ a full disambiguation occurs. By definition, the belief at k ~1 i.e., $[X_{k-1}]$ contains the component corresponding to the ground truth. The subsequent computation of DA-BSP would yield weights that are all strictly 0 except the one corresponding to the ground truth. However in the case of pruned DA-BSP this might not be true. as the ground truth component might be pruned away in $b[X_{k-1}]$, leading to an incorrect data association at time increment k. Note that this requires either the weight of the correct component to be too low or the pruning threshold to be too high. The former usually does not occur if the initial multi-modal belief contains the correct component. The latter can be avoided by judicious choice of the pruning threshold.

Arbitrary levels of ambiguities in scenes may also be treated. Scenes are implicit features of the world and may be a combination of several objects. For example, in a scene of an office, each cubicle with walls and a chair would typically form a part of a scan which is treated as a single scene.

6. Implementation of Data Association Aware BSP

A DA-BSP system was implemented with the following tools. Components of GMMs were represented as factor graphs to enable a tool like GT-SAM™ to generate time-efficient inferences. A mapping and navigation robot, Pioneer™ was operated, with support from the Robotics Toolbox™ Robot Operating System (ROS). To simulate a complex world with arbitrary levels of ambiguity, Gazebo™ provided input to both the robot and the ROS infrastructure. The DA-BSP algorithm itself was implemented in object-oriented MATLAB with the aim of striking a balance between rapid prototyping and obtaining a generalizable implementation that could be easily ported to languages such as C++.

6.1 Real-World Application with Explicit Scenes

A DA-BSP system was implemented for navigating an octagonal corridor with ample instances of ambiguous and aliased scenes. The state space $X \in R^3$ consisted of 2D coordinates of mapped objects, as well as the orientation of the robot. A predefined map of the environment was established by AprilTags™ and their corresponding ids. This facilitated a simulation of arbitrary levels of perceptual aliasing by Apriltags with identical tag ids. Initially, the belief of the robot pose was a multi-modal distribution, represented by a GMM with 4 components having equal weights. Typically, the tag detection is decided by the centrality of a tag in an observed image. (In a further implementation, a robot navigated an aliased two-floor office room environment. The robot was fit with sensors for laser scanning and odometry estimation, and used Iterative Closest-Point (ICP) for laser scan matching. A laser scan of an office cubicle with chair and desk, was, for example, considered a single scene.)

The objective of the robot was to localize itself and to reach a specific elevator. Initially, the planner was provided with a set T of control trajectories. Consequently, depending on the planning algorithm used (i.e., DA-BSP, BSP-uni or BSP-mul) as well the planning horizon L, the cost of each trajectory $\tau \in T$ was evaluated and the optimal (with respect to a cost) trajectory was chosen. Note that these trajectories are different in length and, due to the specific nature of the problem, the robot also witnessed different levels of perceptual aliasing while following them.

Each time increment of planning, followed by implementation of the optimal control action and the consequent inference, is called an epoch.

Due to limitations such as out-of-view or far-from-center tags, a reliable observation might not be available at each motion increment (i.e., action). In such conditions, no data association can be made (as there is no measurement) and consequently, DA-BSP behaves exactly like the usual belief space planning, albeit with a prior that could have many components.

When a perceptually aliased observation is made, DA-BSP adjusts the weights of the components of the posterior. After a simple pruning, the number of components may be reduced. This reduction could be due, for example, to there being an slight asymmetry at the ends of the corridors.

However, when ambiguous data association occurs, DA-BSP considers all possible associations and weighs each new component of the posterior according to the Eq. Eq. 43.

Figure 5:
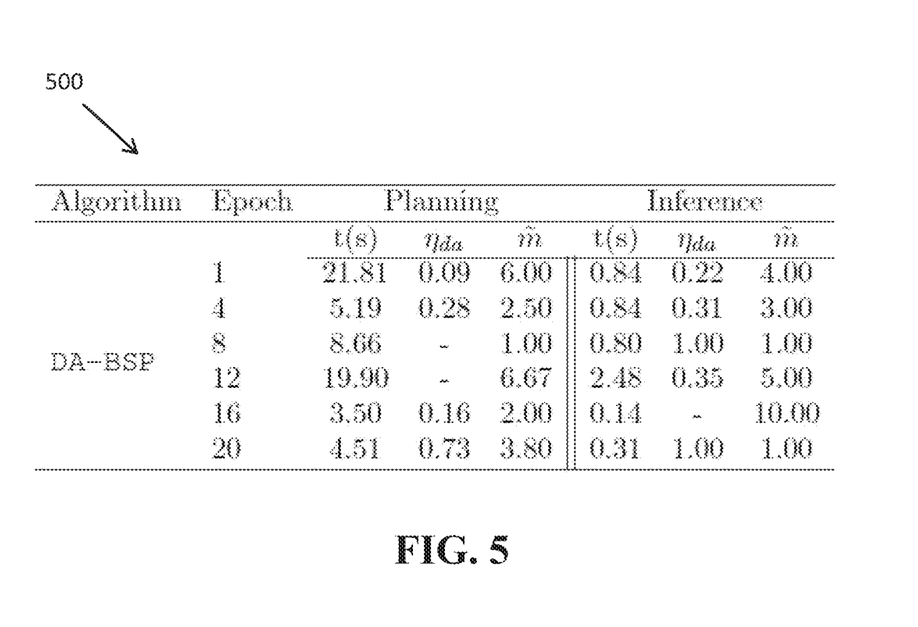
FIG. 5 is a table of results for operating a robot within a framework of data association belief space planning, according to an embodiment of the present invention.

The result of running DA-BSP on the setup described here is shown in table 500 of FIG. 5. The planning horizon was L=4. The times in seconds spent in planning and in inference is denoted by t, while $\hat{m}$ stands for the number of average modes. The computational cost of DA-BSP planning depends on the number of components maintained in the posterior belief pdf, i.e., by $\hat{m}$. $\hat{m}$ indicates the level of disambiguation with the belief while $\xi_{ca}$ shows how well the correct data association is accounted for. The data shows, for example, at epoch 20, that both planning and inference have high values of $\xi_{ca}$ (0.73 and 1.00 respectively) but full disambiguation occurs for inference only ($\hat{m}$=1). Note that DA-BSP considers robust active and passive inference in a single framework. Hence, whether it is reasoning about future observations while planning (the left part of the table) or it is about inferring based on a given observation (the right part of the table), the DA-BSP algorithm remains the same.

Here, the trajectory under evaluation has 24 actions. At the start, the belief has 4 modes with equal weights. DA-BSP results in these components being differently weighed in the next epoch while at the epoch 4 only 2 components remain. Later on (such as epoch 18) many more components arise as the AprilTags are more densely distributed on the inner walls of the initial corridors.

Once the planning is performed under DA-BSP, the subsequent posterior at the end of each epoch might have more or even less components than before. The former occurs when presence of identical close by tags causes perceptual aliasing while the latter is the result of unlikely components being pruned away naturally, in the light of new observations.

DA-BSP when compared with BSP-uni and BSP-mul, trades computation efficiency with correctness of data association. On one hand, DA-BSP always has a component corresponding to the correct data association (seen from the boolean flag DA) while on the other, it is significantly slower than BSP-uni and BSP-mul especially for non-myopic planning with larger horizons (seen from the time taken, denoted by t). However, exponential blowup of computational complexity as the planning horizon increases is an issue not specific to DA-BSP. Fortunately, due to parsimonious data association (grounded in the fact that the actual world is not replete with exact similarities) the additional cost of DA-BSP may not be significantly more; e.g., BSP-mul has a similar magnitude of time taken.

Another unique aspect of DA-BSP is that the weights of the components are adjusted as appropriate considering all future observations in both myopic and non-myopic settings. Based on the configuration of the environment, a longer planning horizon may enable quicker disambiguation and consequently reduced KL-cost. The number of components as well as the cost may vary across different epochs of DA-BSP and also under various planning horizons.

CONCLUSIONS

The data association aware belief space planning (DA-BSP) approach relaxes the assumption that data-association is certain. In the passive approach with observations provided, DA-BSP results in a more robust inference. In the active approach whereby planning considers possible future observations, DA-BSP provides better action selection such that bad inferences and actions leading to ambiguities are avoided. DA-BSP is a more faithful representation of an aliased environment because the number of components can increase as well as decrease.

It is to be understood that the following claims are intended to cover all of the generic and specific features of the invention herein described and all statements of the scope of the invention which, as a matter of language, might be said to fall there between.

What is claimed:

1. A method implemented by a robot operating in an environment having a plurality N of perceptually aliased scenes, wherein the robot comprises at least one sensor and a programmed task, wherein performing the programmed task includes implementing one or more of a set of control actions, and wherein each control action changes a pose of the robot, the method comprising:
    inferring, from a current observation made by the at least one sensor, while the robot is at a current pose, a current belief probability distribution function (pdf) about the current pose;
    determining a future, propagated belief pdf about a simulated future pose of the robot, by simulating an application of a candidate control action to the current belief pdf;
    sampling from the future, propagated belief pdf a range of sampled future poses, and generating, for the sampled future poses, corresponding future observations;
    for each sampled future pose x, associated with a corresponding future observation z, determining, for each aliased scene $A_i$ of the N perceptually aliased scenes, a respective posterior belief pdf about the sampled future pose x, conditioned on the future observation z being an observation of the aliased scene $A_i$, and calculating for each of the posterior belief pdfs, a corresponding likelihood weight indicating a probability that the corresponding future observation z is of the aliased scene $A_i$;
    responsively calculating, from each posterior belief pdf and its corresponding likelihood weight, a weighted posterior belief pdf, to generate a set of weighted posterior belief pdfs;
    calculating from the set of weighted posterior belief pdfs an objective function providing an estimated value of implementing the candidate control action;
    comparing the estimated value of the candidate control action with estimated values calculated for one or more additional control actions, to determine an optimal control action, and executing the optimal control action to put the robot at a new pose.

2. The method of claim 1, further comprising making a new observation from the new pose and determining, from the new observation, a new belief pdf of the new pose of the robot.

3. The method of claim 2, wherein determining the new belief pdf comprises determining that an observed new scene is a singular scene having no aliases, resulting in disambiguation such that the new pdf includes only one pdf component corresponding to the singular scene.

4. The method of claim 1, wherein calculating the objective function comprises integrating a product of two factors over the future observations, wherein a first factor is a sum of the likelihood weights for a given future observation, and wherein the second factor is a cost function that is a function of a sum of the set of weighted posterior belief pdfs for a given future observation.

5. The method of claim 1, wherein sampling generating, for the sampled future poses, the corresponding future observations comprises associating the sampled future poses with the respective corresponding future observations according to a mapping of the environment.

6. The method of claim 1, wherein the future observations, generated from the sampled future poses, are determined by predefined event likelihood relationships.

7. The method of claim 1, wherein the objective function includes a cost function that determines an estimated cost of the candidate control action, wherein the cost function is based on a Kullback-Leibler (KL) divergence with respect to the likelihood weights.

8. The method of claim 1, wherein determining the optimal control action is a multi-stage planning process, and wherein the optimal control action is a control action initiating an optimal sequence of control actions.

9. The method of claim 1, wherein the set of weighted posterior belief pdfs are pruned by comparing each corresponding likelihood weight with a predefined weight threshold, to ignore likelihood weights having negligible probabilities.

10. A robotic system for navigating a perceptually aliased environment, comprising a robot having at least one sensor and a programmed task, wherein performing the programmed task includes implementing one or more of a set of control actions, wherein each control action changes a pose of the robot, and wherein the robotic system includes a processor and a memory with instructions that when executed by the processor perform steps of:
    inferring, from a current observation made by the at least one sensor, while the robot is at a current pose, a current belief probability distribution function (pdf) about the current pose;
    determining a future, propagated belief pdf about a simulated future pose of the robot, by simulating an application of a candidate control action to the current belief pdf;
    sampling from the future, propagated belief pdf a range of sampled future poses, and generating corresponding future observations;
    for each sampled future pose, x, associated with a corresponding future observation, z, determining, for each aliased scene, $A_i$, of the N perceptually aliased scenes, a respective posterior belief pdf about the sampled future pose x, conditioned on the future observation z being an observation of the aliased scene $A_i$, and calculating, for each of the posterior belief pdfs, a corresponding likelihood weight indicating a probability that the corresponding future observation z is of the aliased scene $A_i$;

responsively calculating, from each posterior belief pdf and its corresponding likelihood weight, a weighted posterior belief pdf, to generate a set of weighted posterior belief pdfs;

calculating from the set of weighted posterior belief pdfs an objective function providing an estimated value of implementing the candidate control action;

comparing the estimated value of the candidate control action with estimated values calculated for one or more additional control actions, to determine an optimal control action, and executing the optimal control action to put the robot at a new pose.

\* \* \* \* \*